J. H. KOSSMANN.
RESILIENT TIRE.
APPLICATION FILED FEB. 7, 1918.
1,269,720.
Patented June 18, 1918.
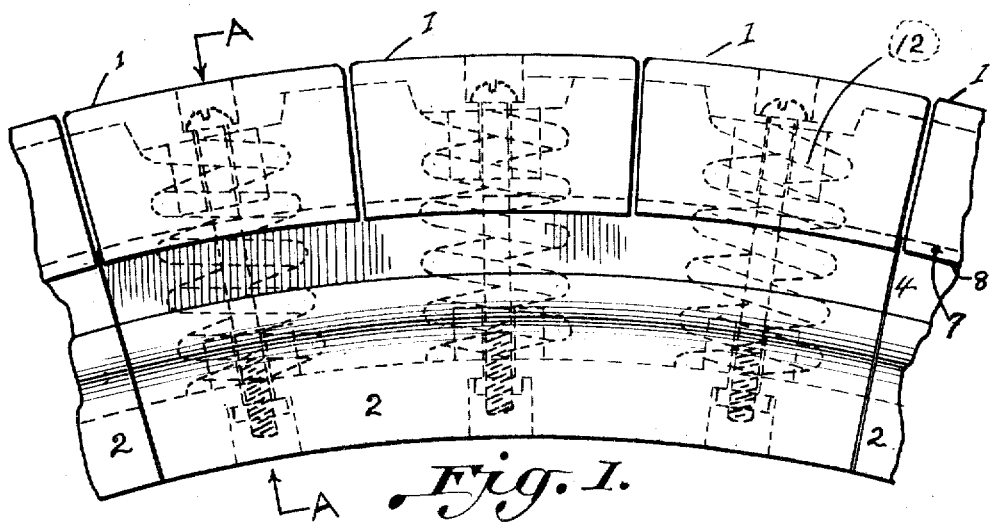
Fig. 1.
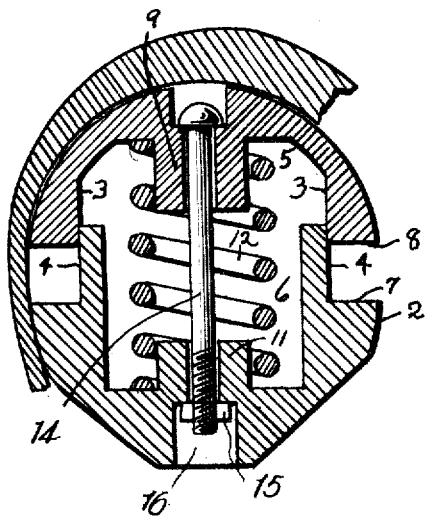
Fig. 2.
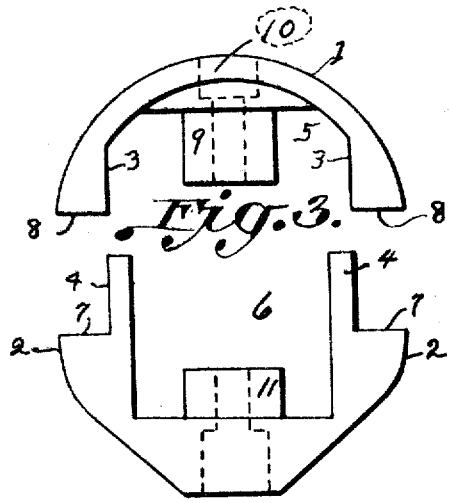
Fig. 3.
Fig. 4.
INVENTOR.
John Henry Kossmann
BY John C. Higdon
ATTORNEY.

UNITED STATES PATENT OFFICE.

JOHN HENRY KOSSMANN, OF ST. LOUIS, MISSOURI.

RESILIENT TIRE.

1,269,720.

Specification of Letters Patent.

Patented June 18, 1918.

Application filed February 7, 1918. Serial No. 215,847.

*To all whom it may concern:*

Be it known that I, JOHN HENRY KOSSMANN, a citizen of the United States, residing at St. Louis, in the State of Missouri, have invented certain new and useful Improvements in Resilient Tires, of which the following is a specification containing a full, clear, and exact description, reference being had to the accompanying drawings, forming a part hereof.

My invention relates to certain improved mechanical spring-devices, for filling the interior of a common pneumatic tire outercasing, and it consists in the novel construction and combination of parts which I have hereinafter fully described and claimed.

The object of my invention is to provide a novel tire construction which shall obviate the necessity of using pneumatic tires, and which shall make use of a common outer casing of a pneumatic tire (in such instances in which an outer casing is deemed necessary or desirable, to protect the mechanical spring-devices of my invention from dirt, dust, snow, ice and rust) and improved filling-devices which will render the tire "puncture proof," without greatly interfering with the resiliency; in fact, my principal object is to provide an improved "airless" tire which shall be substantially as soft and resilient as is a fully-inflated pneumatic tire of the same size.

In the drawings,

Figure 1 is a side elevation of my mechanical internal spring-devices, only a portion of a complete set being shown, it being understood that the broken away portions are mere duplications of those shown.

Fig. 2 is a cross-section through the device, taken on the line A—A of Fig. 1.

Fig. 3 is an end elevation of a sliding cap-section, and

Fig. 4 is an end elevation of the base section.

The numeral 1 designates numerous cap-sections, which may be cast of suitable metal, or which may be drop-forged, or stamped out of any suitable material.

The said cap-sections 1 are mounted to slide radially upon a base-section 2, which also may be cast or otherwise made out of suitable material, such as steel or any common alloy.

Said base section 2 may be in the form of a complete integral ring, when the common "quick detachable and demountable" rim (not shown) is used; or as here shown, the base may be in the form of short sections of any desired length.

The said cap-sections are made with opposite internal guide-walls 3 which contact with and are guided by opposite parallel guide-wings 4 of the said base-section 2, said cap-sections being provided with a recess 5, and the said base section 2 being formed with a longitudinal groove 6 in its outer face.

A shoulder or abutment 7 is formed on the said base section 2, at the base of each of the said guide-wings 4, so that the adjacent inner edges 8 of the said cap-sections will contact with the said shoulders whenever the limit of resilient movement of the said cap-sections is reached, in overloading the tire, or in striking an obstruction with great force during high speed of the automobile carrying the tire.

A perforated boss 9 is located in the said recess 5 of each cap-section 1, and it may be formed (cast or otherwise) integral with said section, or it may be separate therefrom, the perforation in said boss registering with a countersunk perforation 10 formed in the outer wall or tread of said section.

A perforated boss 11 is located in the said groove 6 of the base-section 2 in radial alinement with each perforated boss of the said series of cap-sections, the perforation in said groove boss being in alinement with a corresponding perforation of the adjacent cap-section 1.

Suitable resilient devices, such (for instance) as the common steel springs 12, are seated in the said longitudinal groove 6 of said base-sections, and with their outer ends seated in adjacent recesses 5 of adjacent cap-sections of the tire, the outer ends of said springs being held in position (or centered) by being placed over the adjacent bosses, and the inner ends of said springs being seated at the base of said groove 6 and held in alinement with the adjacent cap-section bosses by the base-section bosses 11.

Each section 1 is held in place upon its base section by a bolt 14, which passes through the registering perforations of both sections, with its head concealed in the countersunk perforation 10 of its cap-section, and with its nut 15 seated in a countersunk perforation 16 formed in the inner wall of said base section.

In use, my improved mechanical spring devices are (in cases where it is desired to use an outer casing) placed within said casing much in the same way in which a common inner tube is used, the springs 12 acting to force the cap-sections firmly into contact with the said outer casing, and filling the same in such a manner that when said casing containing my spring-devices is placed upon the usual rim of an automobile wheel the external appearance of the tire will be almost identical with that of the ordinary inflated pneumatic tire casing.

In the case of heavy trucks, no outer casing need be used, the cap-sections themselves forming the tread of the tire.

I claim:

An improved resilient-tire, consisting of base-sections having longitudinal grooves in their outer peripheries; bosses at the bases of said grooves opposite parallel guide-wings extending continuously the full length of said base-sections; stop-shoulders exterior of said guide-wings and also extending the full length of said base-sections; a series of cap-sections arranged to slide radially upon the said guide-wings of said base-sections, and when at the limit of their inward movement to rest throughout their lengths upon the said stop-shoulders; bosses formed on the interior of said cap-sections in alinement with opposite ones of said bosses at the bases of the grooves in said base-sections; springs mounted upon oppositely-alined bosses and bolts passing through perforations in the oppositely alined bosses of the said base and cap-sections.

In testimony whereof I have signed my name to this specification in presence of two subscribing witnesses.

JOHN HENRY KOSSMANN.

Witnesses:
 FRANCES HOOVER ROSENBAUM,
 JOHN C. HIGDON.

Copies of this patent may be obtained for five cents each, by addressing the "Commissioner of Patents, Washington, D. C."